(No Model.)
H. DODS & F. HINDES.
CABLE GRIP APPARATUS.
No. 290,003. Patented Dec. 11, 1883.
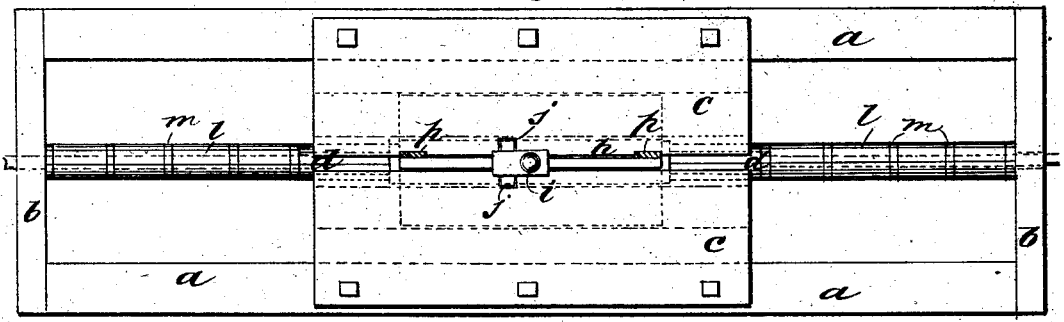
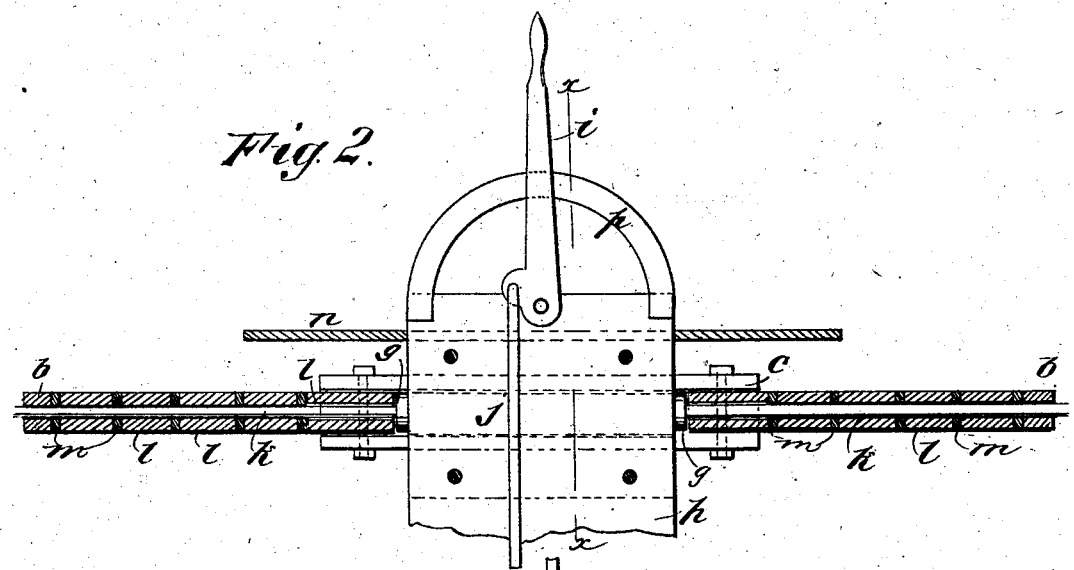
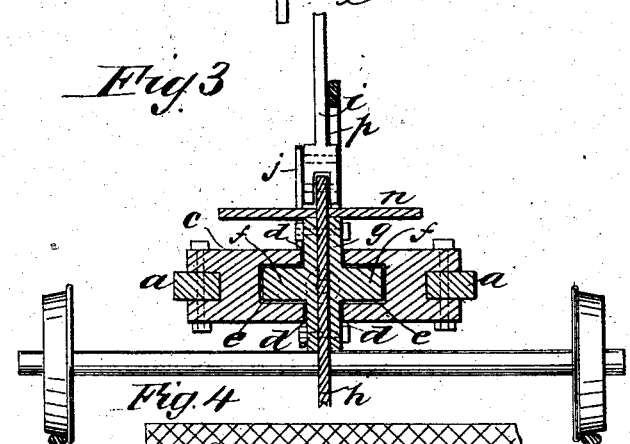
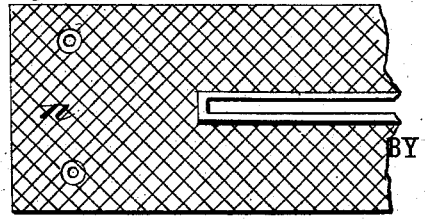
WITNESSES:
F. McArdle
C. Sedgwick
INVENTOR:
H. Dods
F. Hindes
BY Munn & Co
ATTORNEYS.

UNITED STATES PATENT OFFICE.

HENRY DODS AND FRANK HINDES, OF VIRGINIA CITY, NEVADA.

CABLE-GRIP APPARATUS.

SPECIFICATION forming part of Letters Patent No. 290,003, dated December 11, 1883.

Application filed October 16, 1883. (No model.)

*To all whom it may concern:*

Be it known that we, HENRY DODS and FRANK HINDES, both of Virginia City, in the county of Storey and State of Nevada, have invented a new and Improved Cable-Grip Apparatus, of which the following is a full, clear, and exact description.

Our invention consists of an improved compensating spring device, in combination with the grip of a car and the endless cable for operating cars, to relieve the shocks of gripping the cable, and particularly to prevent the slipping of the grip device on the cable, and thereby avoid the damage which the slipping of the grip by the inertia of the car causes, as hereinafter fully described.

Reference is to be had to the accompanying drawings, forming part of this specification, in which similar letters of reference indicate corresponding parts in all the figures.

Figure 1 is a plan view of our improved grip apparatus with the lever-guide for the grip-lever in section and the operator's platform detached. Fig. 2 is a longitudinal sectional elevation of Fig. 1 with the platform in place. Fig. 3 is a transverse section of the apparatus on the line $x$ $x$ of Fig 2, and Fig. 4 is a plan view of a portion of the platform on which the operator stands.

We attach a strong frame, $a$ $b$, to the car-body or truck in any approved way, on which frame the bed-plate $c$ is secured, said bed-plate having the vertical slit $d$ along its longitudinal center, and also having the grooved guideways $e$ in the walls of the slit. In these guideways we arrange the ribs $f$ of a slide, $g$, to which the plate $h$ of the grip devices (not shown) is securely bolted, with its lever $i$ and connecting-rod $j$ attached to it, and this slide $g$ has a long rod, $k$, extending from each end through the end bars, $b$, of the main frame, in which it moves freely, and having strong rubber or coiled springs $l$, with intervening washers $m$, covering the whole distance between the ends of the slide and the frame-bars $b$, to form buffer-springs to yield and allow the grip to start in advance of the car, and overcome the inertia of the car by the recovery of the springs, thus enabling the grip to be started instantaneously and without slipping on the cable, so as to avoid injury to it, and to start the car more easily.

The platform $n$ for the operator to stand on is attached to the grip-plate $h$, so that he rides with the grip to retain his position relatively thereto.

$p$ represents the lever-guide.

Having thus described our invention, what we claim as new, and desire to secure by Letters Patent, is—

1. In a grip device mounted on a slide having buffer-springs, the operator's platform $n$, attached to and moving with the grip-plate, substantially as described.

2. The combination, in a grip device for cable-cars, of the frame $a$ $b$, attached to the car, bed-plate $c$, having the slit $d$ and guide-grooves $e$, slide $g$, having the grip-plate attached to it, and the buffer-springs attached to the slide, substantially as described.

HENRY DODS.
FRANK HINDES.

Witnesses:
B. SCHWARTZ,
C. E. NUTTALL.